April 4, 1950      A. FRUM      2,502,448
HOMING BEACON INDICATOR

Filed Jan. 8, 1946      2 Sheets-Sheet 1

INVENTOR.
ALEXANDER FRUM
BY
R P Morris
ATTORNEY

April 4, 1950 A. FRUM 2,502,448
HOMING BEACON INDICATOR
Filed Jan. 8, 1946 2 Sheets-Sheet 2

INVENTOR.
ALEXANDER FRUM
BY
R P Morris
ATTORNEY

Patented Apr. 4, 1950

2,502,448

UNITED STATES PATENT OFFICE 2,502,448

HOMING BEACON INDICATOR

Alexander Frum, New York, N. Y., assignor to Federal Telephone and Radio Corporation, New York, N. Y., a corporation of Delaware Application January 8, 1946, Serial No. 639,843

7 Claims. (Cl. 343—106)

This invention relates to radio beacons and more particularly to rotary radio beacons and beacon systems of the type generally called "omni-directional beacons."

Systems have been proposed for providing beacon signals transmitted from the ground which will serve to guide an aircraft on a substantially straight line to a fixed location, regardless of the direction of approach. These beacons generally provide signal indications which will give the pilot of the craft a given signal when he is in a predetermined direction from the station and different signals at different azimuthal locations about the station. For this purpose, different characteristics of the transmitted energy have been proposed. For example, in some proposed systems, the characteristics of the carrier are varied, such as for example, by breaking the carrier up into pulses and varying the spacing between pulses in accordance with the azimuth of the transmitted energy. Other proposed systems vary the characteristics of the modulation of the carrier, such as for example, by varying the frequency modulation of the carrier or varying the phase or amplitude of the modulation, or varying the relative phase, frequency, or amplitude of one modulation frequency with respect to another modulation frequency. The receiver in the craft has means for identifying the particular characteristic of the transmission and thereby determining the direction of the craft from the beacon.

One of the difficulties inherent in all such systems is that caused by the width of the beam. Beams frequently vary in width from 20° to as much as 60°. As the beam of the beacon station rotates, the leading edge of the beam will first strike an aircraft. At this instant the transmitted energy will have given signal characteristics indicating a given azimuth. As the beam continues to rotate past the aircraft, these signal characteristics are varied so that by the time the trailing edge of the beam departs from the aircraft, an entirely different set of characteristics producing an indication of an azimuth which may be as much as 20° to 60° from the first azimuth, is introduced. The pilot therefore receives an indication on his receiver which varies by 20° to 60°. It is therefore difficult for the pilot to know his true direction from the beacon.

An object of the present invention is the provision of an improved receiver for a rotary radio beacon.

Another object of the present invention is the provision of a receiver for a rotary radio beacon, of the type described, in which the indefiniteness, due to beam width, is substantially eliminated.

Other and further objects of the present invention will become apparent and the invention will be best understood from the following description of embodiments thereof, reference being had to the drawings, in which:

Fig. 3 is a schematic diagram of a receiver embodying my invention; and

Figure 1:
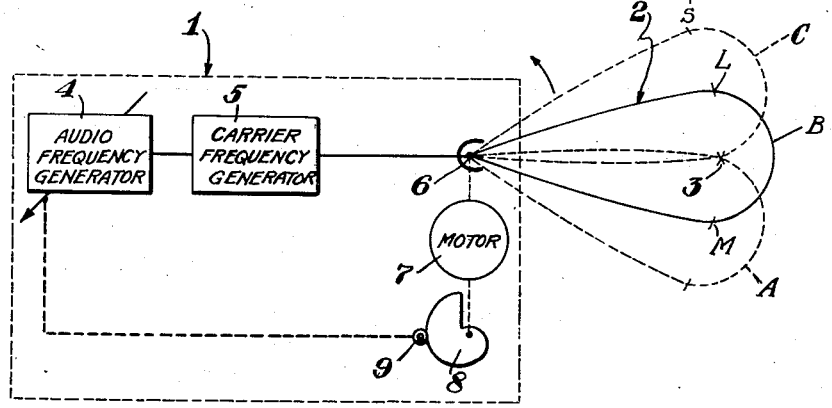
Fig. 1 is a schematic diagram of a rotary radio beacon.

Referring now to Fig. 1, a rotary radio beacon station generally designated by the numeral 1 produces a counterclockwise rotating beam 2 having characteristics which vary with azimuth and are utilized to notify a plane 3 of its direction from the beacon. The beacon 1 may be of the type in which an audio frequency modulates the carrier frequency and the audio frequency is continuously varied as the beam is rotated. For this purpose, the beacon 1 may include an audio frequency generator 4 which modulates a carrier frequency generator 5, whose output is in turn fed to a rotary unidirectional antenna system 6 rotated as for example, by means of a motor 7 at a slow rate, such as for example once every ten seconds. The frequency of the audio frequency generator 4 is varied continuously as the antenna 6 and its beam 2 rotate. This relationship is illustrated in Fig. 1 by showing that the motor 7 drives a cam 8 which moves the cam follower 9 and tunes the audio frequency generator 4. For example, the audio frequency generator 4 may have a frequency of 400 cycles per second when the beam is directed to the north or zero degrees and as the beam rotates (conventionally counterclockwise) this frequency is increased 90 cycles for each 90° of rotation until the beam is at the north point again when the audio frequency generator snaps back from a frequency of 760 cycles to 400 cycles per second. Various known mechanical and electrical means for so controlling the beacon may be utilized instead of the illustrative arrangement here described.

Figure 2:
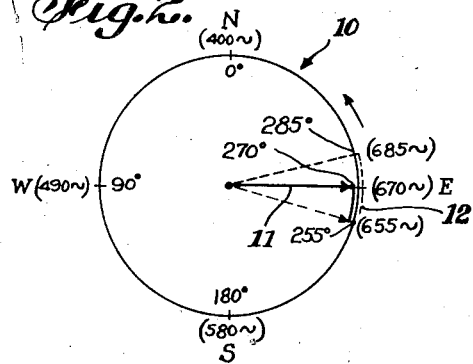
Fig. 2 is a diagrammatic view of the face of an indicator instrument on the receiver.

Referring now to Fig. 2 which represents the face of an indicator instrument in the receiver of the aircraft and is generally designated by the numeral 10, the scale on the face 10 may be calibrated in degrees with 0° and 360° being at the north as is conventional, 90° west, 180° south, and 270° east, etc. When antenna 6 of the transmitter is projecting the beam due northward, the modulation frequency is 400 cycles; when the beam is westward, the modulation frequency is 490 cycles; southward, it is 580 cycles and eastward it is 670 cycles. These frequencies have been marked off on the face 10 adjacent their corresponding degrees of azimuth. With the face 10 there is provided a pointing device such as for example, a needle 11 which assumes a position dependent upon the audio frequency of the energy transmitted by the beacon. Assuming for example, that the beam were directed easterly, as is illustrated in Fig. 1, then the modulation frequency of the energy transmitted at that instant would be 670 cycles. If the beam were extremely narrow, then the needle 11 would, as soon as the beam is encountered, point directly to 270°, which corresponds to 670 cycles. However, the beam has a width which for example, may vary, as stated hereinbefore, from 20° to 60°. Assuming however, that the width of the beam at the distance of craft 3 from the beacon is 30°, that is, 30° from a given signal point L on the leading edge of the beam as it rotates past the craft to an equi-amplitude point M on the trailing edge of the beam then the needle 11 will move over a distance of 30° as indicated by dotted line 12 in the absence of means for correcting this indefiniteness. This will be apparent from Fig. 1 for it will be seen that as the beam is rotating counterclockwise, at position A of the beam the leading edge thereof will touch the aircraft 3 and in this position of the beam, the modulation frequency is 655 cycles and the receiver needle will point to 255°. This modulation frequency will vary as the beam continues to rotate so that when the beam is in position B or pointing "due east," the modulation frequency will be 670 cycles. The beam will then continue to rotate into position C and at position C where the trailing edge of the beam leaves the plane, the beam will have a modulation frequency of 685 cycles. The needle 11 will move with these various modulation frequencies, as indicated by the dotted line 12 (Fig. 2). An indication of such width is unsatisfactory for navigational purposes and an attempt to interpret such an indication becomes quite difficult.

In accordance with the present invention, means are provided in the receivers of such systems to produce an indication which is direct and definite. As has been pointed out if no correction is made for beam width, then from the moment the leading edge of the beam reaches the craft till the time the trailing edge of the beam departs from the craft, the indicator moves with respect to its scale at the same angular velocity as the beam rotates. Thus the indicator covers the whole sector equal in degrees to the beam width at the distance of the aircraft or plane from the beacon. In accordance with a feature of the present invention, use is made of the fact that such beams are usually substantially symmetrical. Points are selected having equal value on the leading and trailing edges of the beam, that is, means are provided for preventing any response until a point on the leading edge of the beam has been reached which has a value equal at least to a predetermined amplitude and the response ceases after the corresponding point on the trailing edge of the beam is reached. In between these points, a progressively increasing effect is produced from the moment the first equi-amplitude point L on the leading edge is reached until the moment when the second equi-signal point M on the trailing edge of the beam is reached. This effect therefore becomes a measure of the width of the beam and is then used to displace the indicator relative to its scale to a position half way between the position it would have reached at the first point L and the position it would have reached at point M. When point L on the leading edge of beam 2 reaches the aircraft 3, the receiver is actuated so that the nedle assumes a position pointing to an angle of 255° (see Fig. 2). When the second point M on the trailing edge of the beam leaves the craft 3, the needle 11 will have moved to a position pointing to 285°, that is, it would have so moved in the absence of any correction for beam width. In accordance with the present invention, however, an effect is produced which causes a displacement of the needle halfway between 285° and 255° or to 270°. In one method, this is accomplished by producing a progressively retarding effect upon the needle 11 from the time it reaches the position of 255° and as it moves counterclockwise so that when the signal point M on the trailing edge of the beam leaves the craft, the needle has only reached a half way position or 270°. One system for accomplishing this is illustrated in Fig. 3.

Referring now to Fig. 3, the receiver there illustrated which may be mounted in an aircraft includes a suitable omni-directional antenna system 13 feeding into a detector 14 which serves to remove the carrier frequency and leave only the audio frequency. The output of detector 14 may be then fed through a limiter 15, which prevents any signal passing therethrough until the signal has reached a value over a given threshold. Thus when the leading edge of the beam approaches the craft, no signal will be given out by the limiter until the first of the selected equi-signal points, that is, point L is reached, the signal at point L having a sufficient value to pass the threshold of limiter 15 and produce a response in the output thereof. Of course, it is to be understood that the limiter may be part of the detector or ahead of the detector in the radio frequency stages of the systems. The output of limiter 15 is then fed to a frequency meter generally designated by the numeral 16, it having been assumed in the present embodiment that the directional characteristic is dependent on frequency. The frequency meter 16 is preferably any suitable meter which produces sufficient physical rotation of the shaft to operate a synchro-generator. One type of such meter may include a Wien bridge 17 having two condensers 18 and 19 and a plurality of resistors 20 arranged in the manner illustrated. The input to the Wien bridge comes from the limiter 15 and the output is fed to a two-phase induction motor 21. The bridge is balanced at a given frequency and when the input is of said frequency, no effect is produced in the output of the bridge and the motor 21 remains stationary. When, however, the input frequency varies from the balancing frequency of the bridge, an output is produced causing rotation of the rotor 22 of the motor 21, the rotor 22 in turn being mechanically coupled to the condenser 19 to readjust its tuning. As the rotor 22 turns, the condenser 19 retunes the bridge until balance has again been restored whereupon the rotor 22 ceases turning. Rotor 22 rotates substantially with the beam and begins its rotation as soon as point L on the beam reaches the antenna 13 and ceases its rotation when point M passes the antenna 13. If an indicating needle were attached to the rotor 22, it would rotate through an angle equal to the beam width. This would not, as explained hereinabove, produce a satisfactory indication. Accordingly, means are provided for retarding indicating needle 11 so that when point M of the beam leaves antenna 13, the needle 11 will point to half the angle through which rotor 22 turns or in the given illustration, 15°, that is, from 255° to 270°.

To produce this effect the output of the limiter is fed to an integrating network 23 which serves to integrate from crest to crest of the audio frequency output of the limiter and causes an amplifier 24 to immediately close a relay 25 and connect a current source 26 to a timing motor 27, which timing motor is adapted to rotate at a speed equal to half the angular velocity of the beam.

It will be seen that if the needle 11 moves at a rate of speed equal to the difference between the rate of rotation of motor 27 and the rate of rotation of rotor 22, it will move at half the velocity it would have moved if it had been directly mounted on rotor 22 and furthermore it will have moved altogether to a position of 270° in the example herein cited.

This is accomplished by means of a synchro or servomotor system utilizing a synchro differential. The rotor 22 is mechanically connected to the rotor of a synchro-generator 28. The timing motor 27 is mechanically connected to the rotor of a synchro differential 29. Generator 28 and differential 29 are electrically connected to a synchro motor 30 so that the rotor of the synchro motor 30 rotates at a rate equal to the difference between the rate of rotation of the rotors of the generator 28 and the differential 29. The rotor of the synchro motor 30 is then used to turn the needle 11 with respect to the scale on face 10. From the foregoing it will be apparent that the needle 11 in the example herein given, will move from an angle of 255° to an angle of 270° as the beam passes the aircraft, and at its last position at 270°, will indicate the correct azimuth to which the beam is directed.

Various other methods may be used for producing the proper retardation of needle 11 in its travel from the position it first assumes when point L of the beam reaches the antenna 13 to the position it assumes when the point M leaves the antenna 13.

Figure 4:
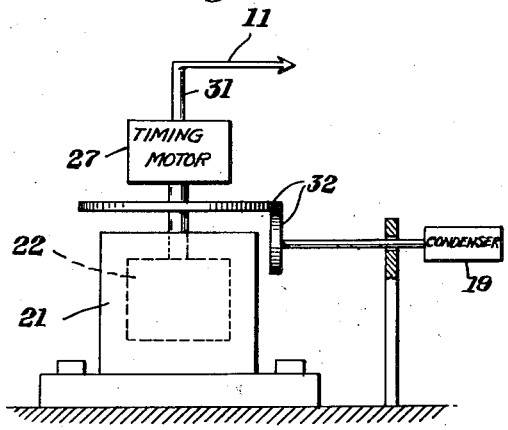
Figs. 4 and 5 are portions of a radio receiver indicating modifications of the receiver illustrated in Fig. 1.

For example, in Fig. 4, the synchro generator differential and synchro motor are omitted and mechanical subtraction means is used for mechanically subtracting the rotation of the timing motor 27 from that of the rotor 22. In the example illustrated in Fig. 4, the housing of the timing motor 27 is mounted on the rotating shaft of the rotor 22 while the rotor of motor 27 is adapted to turn in a direction opposite to the direction in which rotor 22 turns. Consequently, the resultant rotation of the shaft 31 of timing motor 27 is equal to the difference between the time of rotation of rotor 22 and motor 27. The needle 11 moves at an angular velocity equal to this difference. Suitable gearing means 32 connected to the shaft of the rotor 22 is used to adjust condenser 19 or whatever element of the bridge is used to rebalance it.

Figure 5:
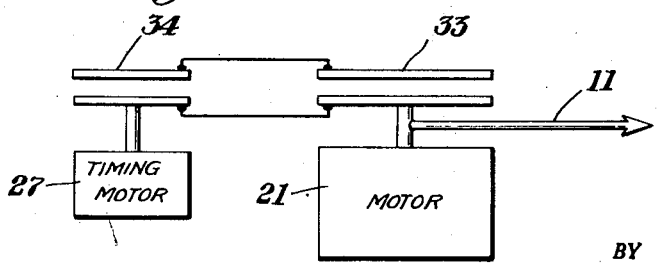
Figure 2:
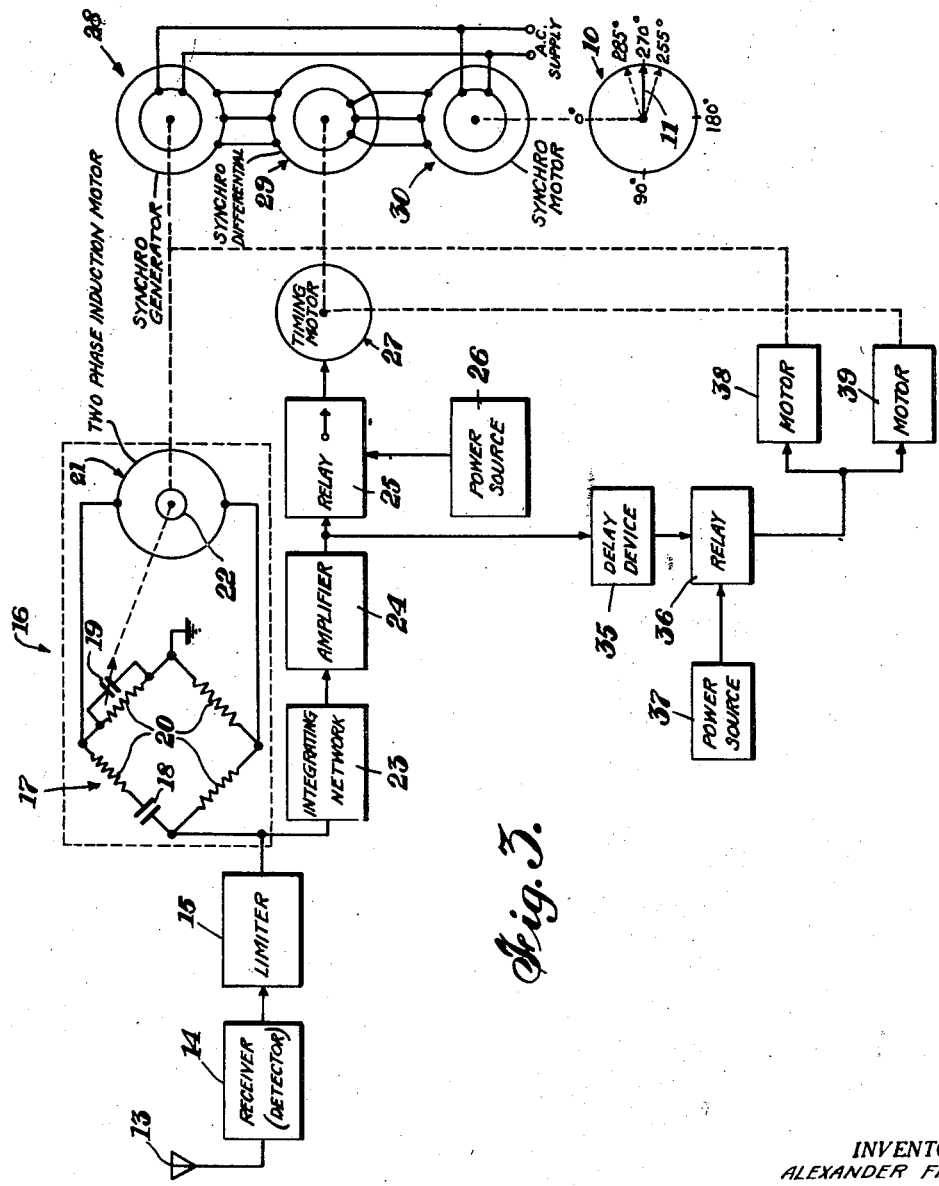

A convenient way of performing the subtraction of the rotational angles electrically is illustrated in Fig. 5. The motor 21 is, as in Fig. 1, controlled by the transmitted azimuth information and seeks a null balance in the bridge by rotating a condenser 19 or the adjuster of one of the resistors. This balancing condenser or resistor, is now split into two parts 33 and 34, respectively, 33 being the main value of the condenser and being directly controlled by motor 21 and 34 being a trimmer parallel condenser (or series resistor respectively wherein resistors are varied) which is controlled by the timing motor 27. The indicating needle 11 is controlled from the shaft of motor 21. During passage of the beam, motor 27 varies the trimmer at a uniform rate and in the same sense in which the motor 21 varies the main unit. Consequently as the motor 21 seeks to establish a null balance, the trimmer changes the combined capacities of 33 and 34 so that the shaft of motor 21 will only rotate half the angle it has rotated in the previous embodiments before the bridge is balanced.

Another technique for making the reading easier is illustrated in Fig. 3. The output of amplifier 24 is fed through a delay device 35 whose output will, after a substantial delay of for example, 7 or 8 seconds, actuate a relay 36 to connect a power source 37 to two motors 38 and 39 respectively, which motors may be of the two-phase induction type or any other suitable type. Motor 38 is mechanically connected with induction motor 22 and restores induction motor 22 to its initial starting position after the lapse of the delay period of device 35. This also returns the synchro-generator 28 to its initial position. To shorten the time required for making motor 22 fall into step with the azimuth information at the next arrival of the beam, motor 38 may turn motor 22 backward only by an amount equal to the average beam width, say by 40–50°, so that at the next arrival of the leading edge of the beam, motor 22 will already be approximately in the correct position for beam tracking. Motor 39 is used to return the timing motor 27 to its original position after the lapse of the delay period of delay device 35 and the return of timing motor 27 to zero position also returns the synchro differential 29 to its original position. When the synchro generator 28 and its differential 29 return to their initial positions, synchromotor 30 also returns to its initial position thereby returning the needle 11 to its zero position. Instead of energizing and deenergizing motors 38 and 39 through relay 36, these motors may be running continuously and relay 36 will then actuate clutch mechanisms by which these motors are engaged with or disengaged from the shafts of motors 21 and 27 respectively. If motor 21 is sufficiently light, motor 38 may be dispensed with as the large unbalanced voltage produced in the Wien bridge at the next arrival of the beam will quickly move motor 21 backward by the angular difference between the trailing and leading beam edge. Motor 39 may be replaced by a spring actuated electromagnetically controlled reset mechanism.

The amount of delay introduced by delay device 35 in the return of the needle 11 to its original position may occupy almost the entire time required for the leading edge of the beam to return to the receiver after the trailing edge has left the receiver.

Furthermore while I have shown the indicator to be in the form of a needle moving over a scale, it will be apparent that this system may also be employed in connection with other types of indicators, including cathode ray tube type indicators as for example, as illustrated in my copending application, Serial No. 639,844, filed January 8, 1946. Furthermore my invention may be used with different forms of beacons using other than varying audio frequency modulation for azimuth identification. While I have shown the details of various embodiments of my invention, it will be apparent to those versed in the art that numerous changes may be made in these details without departing from my invention. Accordingly, while I have described above the principles of my invention in connection with specific apparatus, and particular modifications thereof, it is to be clearly understood that this description is made only by way of example and not as a limitation on the scope of my invention as defined in the accompanying claims.

I claim:

1. A receiver for receiving a cyclically recurring series of signals which have for each cycle continuously and progressively varying characteristics and for indicating the characteristic of substantially the middle signal of a given cycle of the series being received, comprising means for receiving the signals, means responsive to the signals for producing an effect having an initial value determined by the characteristics of the first signal received having a predetermined value and thereafter varying in value as a direct function of the variation of the signal characteristics of the succeeding signals of the series as received, means rendered operative by the first signal of the series and maintained in operation by the other signals of the series for a time determined by the duration of the series received, for producing a second effect which varies with time and has a final value equal to half the value of the variation of the first effect from said initial value to its final value, and means for combining said first and second effects to produce an indication which is a function of the characteristics of substantially the middle signal of the series received.

2. A receiver for receiving a cyclically recurring series of signals which have for each cycle continuously and progressively varying characteristics and for indicating the characteristics of an intermediate signal of a given cycle of the series being received, comprising means for receiving the signals, a first rotatable means, means responsive to the signals for causing rotation of said first rotatable means to an initial position determined by the characteristics of the first received signal having a predetermined magnitude and thereafter rotating in accordance with the variation of the signal characteristics of the succeeding signals of the series being received, a second rotatable means, means rendered operative by the first signal of the series and becoming inoperative after the last signal of the series received for producing a rotation of said second rotatable means which varies with time, and means for combining the first rotation with the second rotation to produce an indication which is a function of the characteristics of said intermediate signal of the series received.

3. A receiver for receiving a cylically recurring series of signals which have for each cycle continuously and progressively varying characteristics and for indicating the characteristics of substantially the middle signal of a given cycle of the series being received, comprising means for receiving the signals, a first rotatable means, means responsive to the signals for producing a rotation of said first rotatable means to an initial position determined by the characteristics of the first received signal having a predetermined magnitude and thereafter rotating from said initial position according to the variation of the signal characteristics of the succeeding signals of the series being received, a second rotatable member, means rendered operative by the first signal of the series and maintained in operation by the other signals of the series received for a length of time determined by the length of the series received for producing a rotation of said second rotatable means which varies with time, and has a total rotation equal to half the total rotation of said first rotatable member from said initial position to its final position, and means for combining said rotations to produce an indication which is a function of the characteristics of substantially the middle signal of the series being received.

4. In a receiver for a radio beacon system of the type wherein cyclically recurrent signals are emitted in the form of a symmetrical directional beam which is angularly shiftable and in which audio frequency modulation of the carrier frequency of the signals is continuously and progressively varied within each recurrent cycle as the beam is angularly shifted; means for receiving, demodulating, and passing only such of the plurality of said signals which reach the receiver as the beam shifts angularly past the receiver as have at least a given amplitude, a frequency meter having means responsive to the passed audio frequency components of the signals, and a rotar for rotating to an initial position determined by the audio frequency of the first passed signal on the leading edge of the beam and thereafter rotating as a direct function of the variation of the audio frequency characteristics of the succeeding passed signals, a timing motor rendered operative by said first passed signal and maintained in operation by said succeeding signals for a period determined by the interval between said first signal and the last of said succeeding signals, and having a signal responsive rotor rotatable through an angle which varies with time and has a final value equal to half the angle through which said frequency meter rotor rotates from its initial position to its final position, and means for combining these rotations to produce an indication which is indicative of the audio frequency of the signal emitted from the beacon at the time the receiver is at the center of said beam.

5. A receiver according to claim 4 wherein said combining means comprises a synchronized follower generator having its shaft mechanically coupled to the shaft of the frequency meter, a differential follower having its rotary shaft connected to the rotor of the timing motor, and a follower motor connected with the follower differential and follower generator so that its rotor rotates through an angle equal to the difference between the angles of rotation of said generator and said differential, and an indicator mechanically coupled to the rotor of the synchro motor and driven thereby.

6. A receiver according to claim 4 wherein said combining means comprises a shaft rotated by the frequency meter in one direction and rotating the housing of the timing motor secured to said shaft to be rotated in the same direction, said timing motor being arranged to have its rotor rotate in an opposite direction, and an indicator mechanically connected to the rotor of said timing motor.

7. A receiver according to claim 4 wherein said frequency meter is comprised of a bridge having a resonant frequency at which its input and output balances, and including elements for tuning said bridge to produce a balance, one of said elements consisting of two separate parts, an induction motor electrically coupled to the output of said bridge and mechanically coupled to one of said parts whereby rotation of said motor produces a movement of said part which tends to rebalance the bridge, and means mechanically coupling the timing motor to another of said parts to retard the balancing movement of said motor.

ALEXANDER FRUM.

REFERENCES CITED

The following references are of record in the file of this patent:

UNITED STATES PATENTS

| Number    | Name                 | Date           |
|-----------|----------------------|----------------|
| 1,379,541 | Erskine-Murray et al.| May 24, 1921   |
| 1,983,079 | Hansen               | Dec. 4, 1934   |
| 1,988,006 | Greig                | Jan. 15, 1935  |
| 1,991,476 | Thomas               | Feb. 19, 1935  |
| 2,014,732 | Hansell              | Sept. 17, 1935 |
| 2,257,320 | Williams             | Sept. 30, 1941 |
| 2,273,098 | Foster               | Feb. 17, 1942  |
| 2,387,569 | Eggers               | Oct. 23, 1945  |
| 2,402,410 | Kear                 | June 18, 1946  |
| 2,404,501 | Kear                 | July 23, 1946  |